United States Patent [19]

Nanri et al.

[11] Patent Number: 5,212,215

[45] Date of Patent: May 18, 1993

[54] LIGHT ANTI-CHIPPING COATING

[75] Inventors: Yasuo Nanri, Chiryu; Mitsuo Hironaga, Toyota; Akio Sato, Chiryu, all of Japan

[73] Assignee: Nihon Tokushu Toryo Co., Ltd., Tokyo, Japan

[21] Appl. No.: 662,380

[22] Filed: Feb. 26, 1991

Related U.S. Application Data

[63] Continuation of Ser. No. 193,718, May 13, 1988, abandoned, which is a continuation-in-part of Ser. No. 922,606, Oct. 24, 1986, abandoned.

[30] Foreign Application Priority Data

Oct. 29, 1985 [JP] Japan .................... 60-240474
Dec. 17, 1985 [JP] Japan .................... 60-281981
Apr. 21, 1986 [JP] Japan .................... 61-90113

[51] Int. Cl.⁵ ............................................. C08J 9/32
[52] U.S. Cl. .................................. 523/218; 524/427; 524/493; 524/494; 524/527; 524/569; 524/907

[58] Field of Search ............... 523/218; 524/527, 569, 524/907, 427

[56] References Cited

U.S. PATENT DOCUMENTS

| | | | |
|---|---|---|---|
| 4,010,134 | 3/1977 | Braunisch et al. | 523/218 |
| 4,510,201 | 4/1985 | Takauchi et al. | 428/313.3 |

FOREIGN PATENT DOCUMENTS

| | | | |
|---|---|---|---|
| 26388 | 4/1981 | European Pat. Off. | |
| 1066737 | 4/1986 | Japan | 523/218 |
| 2260867 | 11/1987 | Japan | 523/218 |

*Primary Examiner*—John C. Bleutge
*Assistant Examiner*—Mark Sweet
*Attorney, Agent, or Firm*—Flynn, Thiel, Boutell & Tanis

[57] ABSTRACT

A light anti-chipping coating consisting of vinyl chloride plastic sol is manufactured by employing a hollow filler as a small portion of the overall filler component. Doing so permits weight reduction without deteriorating the anti-chipping property of the light anti-chipping coating.

6 Claims, No Drawings

LIGHT ANTI-CHIPPING COATING

This application is a continuation of U.S. Ser. No. 07/193,718, filed May 13, 1988, abandoned, which is a continuation-in-part of U.S. Ser. No. 06/922,606, filed Oct. 24, 1986, abandoned.

BACKGROUND OF THE INVENTION

1. Field of the Invention

This invention relates to a light anti-chipping coating obtained by substituting organic hollow filler and/or inorganic hollow filler for a small portion of the filler component of an anti-chipping coating based on a vinyl chloride plastisol.

2. Description of the Prior Art

Recently, anti-chipping coatings consisting of vinyl chloride plastisols (hereinafter referred to as VCPS) are employed in lieu of conventional asphalt series undercoat materials to coat such vehicle parts as a side seal, a fuel tank, a front apron and a tire house, using an airless coating apparatus, in order to protect these parts from damage that may otherwise be caused by stones striking them during running of the vehicle.

As for the technology of using hollow fillers, there are hollow fillers used as a filler component of baking type sound-proof coatings consisting of rubber component and filler component (as disclosed in Japanese Patent Laid-Open 55-58261) and hollow fillers in rubber asphalt emulsion in a method of sound/vibration prevention using a coating consisting of rubber asphalt emulsion and solidifying agent (as disclosed in Japanese Patent Laid-Open 60-87879).

There has been growing demands for increasing the area of coating and thickness of coating films of anti-chipping coatings consisting of the VCPS noted above in order to extend the life of vehicles and improve the level of the rust-proof requirements.

Such measures, however, increase the weight of the vehicle and are hence undesired from the standpoints of the running performance and energy saving through weight reduction of the vehicle.

SUMMARY OF THE INVENTION

The present invention has an object of providing a light anti-chipping coating, which is small in grain size and light in weight without deteriorating at all the anti-chipping performance per unit volume of the coating.

Another object of the invention is to provide a light anti-chipping coating, which can be coated without coating irregularities and which can reduce gear of piston section and tip section of a coating apparatus.

The invention is based on a finding that by employing a hollow filler to replace a small portion of the filler in the manufacture of an anti-chipping coating based on VCPS, it is possible to obtain a VCPS-based anti-chipping coating, which is light in weight, can be coated without coating irregularities and can reduce wear of the piston section and tip section of coaters while ensuring anti-chipping performance comparable to that of the prior art anti-chipping coatings.

The invention features a light anti-chipping coating, which is obtained by a process comprising dispersing a vinyl chloride resin in a plasticizer and adding filler including a hollow filler and additives to the dispersoid.

The vinyl plastisol comprises 100 parts by weight of a vinyl chloride series resin, from 50 to 200 parts by weight of a plasticizer for said resin, from 80 to 350 parts by weight of a filler and from 2 to 20 parts by weight of other additives.

The hollow fillers are low in bulk specific gravity compared with conventional fillers used for anti-chipping coatings.

Thus, it is possible to reduce the bulk specific gravity of the anti-chipping coating incorporating them from values of 1.35 to 1.55 to values of 0.90 to 1.15, i.e., by 0.3 to 0.6.

Further, the substitution of the hollow filler for a small portion of the conventional filler component never leads to deterioration of the performance of the anti-chipping coating or like deficiency.

The VCPS is obtained by dispersing a vinyl chloride resin in a plasticizer and adding a filler and various additives.

Suitable examples of the vinyl chloride series resins are homo-polymers such as polyvinyl chloride, polyvinylidene chloride and the like and copolymers comprising vinyl chloride, vinyl acetate, vinylidene chloride and the like.

Suitable examples of the plasticizer are a phthalic acid ester, an ester of dibasic acid, a phosphoric acid ester and polyester plasticizers, and dioctyl phthalate (DOP) is particularly preferred.

Examples of the conventional filler are talc, calcium carbonate, diatomaceous earth, mica, kaolin, barium sulfate, magnesium carbonate, graphite, alumina, silica, rubber thermoplastic resin and the like.

These fillers are in the form of powder.

Further, it is possible to employ such coloring agents as titanium oxide, carbon black, and the like.

The hollow filler which is incorporated as an indispensable constituent of the present invention may be either organic or inorganic.

Examples of the organic hollow fillers are fillers made of polyolefin series resins, polyvinyl chloride series resins, polystyrene copolymer resins, amino resins, phenol resins and unsaturated polyester resins and carbon.

These fillers are in the form of hollow spherical particles.

Examples of the inorganic hollow fillers are glass balloons and silica balloons.

According to the invention, it is essential to substitute a hollow filler for a small portion of the total filler.

When employing an organic hollow filler, it is preferably incorporated to replace 0.5 to 5% by weight of the total filler.

If the amount of substitution is less than 0.5% by weight, the effect of weight reduction is insufficient.

If the amount of substitution exceeds 5% by weight, also deterioration of the anti-chipping performance is liable to occur, and economy is sacrificed too much.

When employing the inorganic hollow filler, the amount of substitution is 1 to 30% by weight. A preferred amount of substitution is from 1 to 9% by weight.

If the amount of substitution is less than 1% by weight, the effect of weight reduction is insufficient.

If the amount of substitution is above 9% by weight, on the other hand, wear of the piston section and tip section of coating apparatus are liable to occur.

When employing a combination of organic and inorganic hollow filler, the amount of substitution is from 0.5 to 9% by weight of the overall filler.

If the substitution amounts are less than the ranges noted above, the effect of weight reduction is insufficient.

If the substitution amounts are an excess of the ranges noted above, on the other hand, wear of the piston section and tip section of the coating apparatus are liable to occur due to reduction of the anti-chipping performance and also due to the inorganic hollow filler.

The hollow fillers employed in accordance with the invention are expected to have a compressive strength of above 120 kg/cm$^2$. If the compressive strength is lower than about 120 kg/cm$^2$ the hollow fillers will be crushed when the anti-chipping coating is coated using an airless spray or the like.

However, it is possible to employ not only an airless spray but also a brush to coat the coating.

In such a case, the compressive strength of the hollow filler can be lower than 120 kg/cm$^2$.

The hollow filler employed according to the invention is prepared by causing flowable plastic or fused glass having a viscosity of 10 to 20 poise to discharge and blow out from a nozzle or heating a foamed material in the form of particles or causing the material to foam by feeding the material into a high temperature air stream.

The grain size of the organic hollow filler may be less than 200$\mu$, preferably of such an order that 95% by weight of the particles of the filler pass through a 150-mesh sieve (i.e., less than approximately 100$\mu$).

The grain size of the inorganic hollow filler may be less than 300$\mu$, preferably of such an order that 95% by weight of the filler particles pass through a 100-mesh sieve (i.e., less than approximately 150$\mu$).

Excessively small grain size will lead to such problems in the airless spraying as fluctuations of pattern width, clogging of the spray gun and wear of the piston and tip sections thereof.

Also, a coarse finish surface is liable to result.

On the other hand, insufficient grain size will result in reduction of rupture strength so that it is impossible to obtain the effect of a light weight filler.

The bulk density of the organic hollow filler may be less than 0.1, preferably 0.02 to 0.05.

The bulk density of the inorganic hollow filler may be less than 0.6, preferably 0.2 to 0.5.

The bulk density is preferably as small as possible so long as sufficient mechanical strength can be ensured.

According to the invention, it is possible to add a conventional anti-corrosion agent, dispersing agent, viscosity promoter, anti-freezing agent, pH adjuster and other additives to obtain a light anti-chipping coating.

An anti-chipping coating of the present invention is light in weight without deteriorating at all the anti-chipping performance per unit volume of coating, can be coated without coating irregularities and can reduce wear of piston section and tip section of coating apparatus.

PREFERRED EMBODIMENTS OF THE INVENTION

In the following Examples and Comparative Examples contained in Tables 1–4, the criticality of the hollow filler being present in the specified amounts in the anti-chipping coating is illustrated.

In Tables 1–4, "Weight" stands for the weight of the anti-chipping coating in grams/liter. "Weight reduction ratio" is the amount the weight of the specified anti-chipping coating having hollow fillers is reduced as compared to the weight of the same anti-chipping coating composition not having hollow fillers.

The "Anti-Chipping Property Test" evaluates the anti-chipping properties of each coating. This test was performed by coating a test panel consisting of a cationic series electrodeposition coated steel plate having dimensions of 0.8 mm by 100 mm by 200 cm with the specified anti-chipping coating such that the dry coating film has a thickness of 850$\mu$. No occurrences of coating irregularities were found.

After the anti-chipping coating was applied, the panel was baked at 130° C. for 30 minutes and then allowed to sit for 24 hours.

The "nut fall method" disclosed in JASO (Japanese Automobile Standardization Organization) 7006 was used in the test.

A vinyl chloride pipe with an inner diameter of 20 mm and a length of 200 cm was secured in an upright position and the test panel was placed such that its coated surface touched the lower end of the vinyl chloride pipe and had a support angle of 60°.

Brass hexagonal nuts having a shape of Class 3 M-4, as defined in JIS (Japanese Industrial Standard) B-181, were allowed to fall from the top of the vinyl chloride pipe. The anti-chipping property was evaluated in terms of the total weight in kilograms of nuts that are allowed to fall and strike the test panel until the steel surface is exposed.

The "Abrasion ratio" is calculated by first measuring the amount per minute, A, of a first coating that is delivered from a spray gun at a specified pressure. Then 50 kg of the anti-chipping coating is sprayed through the same spray gun. Finally, the amount per minute, B, of the first that is delivered from the spray gun at the specified pressure is determined.

The "Abrasion ratio" is B/A $\times$100%.

EXAMPLES 1 TO 6

A polyvinyl chloride resin as a rain component of anti-chipping coating, dioctyl phthalate (DOP) as a plasticizer, calcium carbonate as a filler, carbon black as a coloring agent, a dispersing agent and an organic hollow filler trademark "Expancel DE", dried and expanded microspheres of vinylidene chloride/acrylonitrile copolymers containing isobutane as a blowing agent and produced by Nippon Fillite Co., Ltd.) were employed in the charging proportion ratio as shown in Table 1.

Each composition was kneaded in a 4-liter can to obtain anti-chipping coating.

The results are shown in Table 1.

EXAMPLES 7 TO 11

Inorganic hollow filler available as "Glass Bubbles B37/2000" (a trade name; produced by Sumitomo 3M Co., Ltd.) was employed in lieu of the organic hollow filler used in Examples 1 to 6 to obtain light anti-chipping coatings having compositions as shown in Table 1 respectively.

The results are shown in Tables 1 and 2.

EXAMPLES 12 TO 20

"Expancel DE" in Examples 1 to 6 and "Glass Bubbles B37/2000" in Examples 7 to 11 were exployed in lieu of the organic hollow filler in Examples 1 to 6 to obtain light anti-chipping coatings having compositions as shown in Table 2 respectively.

The results are shown in Table 2.

COMPARATIVE EXAMPLE 1

The hollow filler in Examples 1 to 20 were excluded, whereby an anti-chipping coating having the composition as shown in Table 3 was obtained. As can be seen by the results in Table 3, this anti-chipping coating composition had a weight reduction ratio of 0%.

COMPARATIVE EXAMPLE 2

The hollow organic filler of Examples 1–6 was incorporated into the anti-chipping coating in an amount smaller than the specified amounts of the present invention. As can be seen by the results in Table 3, this anti-chipping coating composition had a "weight reduction ratio" of only 7.6%.

COMPARATIVE EXAMPLE 3

The hollow filler in Examples 1 to 6 was incorporated in excess of the range defined according to the invention, whereby an anti-chipping coating having a composition as shown in Table 3 was obtained. As can be seen by the results in Table 3, this anti-chipping coating composition had an "anti-chipping property test result" of only 57 kg.

COMPARATIVE EXAMPLE 4

The hollow filler in Examples 7 to 11 was incorporated in an anti-chipping coating in an amount less than the range defined according to the invention, whereby an anti-chipping coating having the composition as shown in Table 3 was obtained. As can be seen by the results in Table 3, this anti-chipping coating composition had a "weight reduction ratio" of only 9.7%.

As is obvious from Tables 1 and 2, with the light anti-chipping coatings of Examples 1 to 20 according to the present invention, it is possible to reduce the volume of coating to 20 to 40% of the prior art value while providing excellent anti-chipping property comparable to that of the prior art anti-chipping coating of Comparative Example 1.

Further, the tip section of the coating apparatus used in Examples 1 to 20 and Comparative Examples 1 to 13 was inspected after coating to reveal that it was extremely worn out in the case of Comparative Examples 5 and 9.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Polyvinyl chloride resin | (Parts by Weight) | 100 | 100 | 100 | 100 | 100 | 100 | 100 | 100 | 100 | 100 |
| DOP | (Parts by Weight) | 90 | 100 | 100 | 100 | 120 | 120 | 100 | 120 | 120 | 120 |
| Calcium Carbonate | (Parts by Weight) | 160 | 150 | 150 | 150 | 150 | 150 | 150 | 150 | 150 | 140 |
| Carbon black | (Parts by Weight) | 1 | 1 | 1 | 1 | 1 | 1 | 1 | 1 | 1 | 1 |
| EXPANSEL DE | (Wt %) | 0.5 | 1 | 2 | 3 | 4 | 5 | — | — | — | — |
| GLASSBUBBLE B37/2000 | (Wt %) | — | — | — | — | — | — | 1 | 3 | 5 | 7 |
| Dispersing agent | (Parts by Weight) | 5 | 5 | 5 | 5 | 5 | 5 | 5 | 5 | 5 | 5 |
| Weight | (g/l) | 1280 | 1190 | 1080 | 1050 | 1020 | 990 | 1270 | 1220 | 1190 | 1180 |
| Weight reduction ratio[1] | (%) | 11.1 | 17.4 | 25.0 | 27.1 | 29.2 | 31.3 | 11.8 | 15.3 | 17.4 | 18.1 |
| Anti-Chipping property Test | (kg) | 65 | 63 | 62 | 62 | 62 | 61 | 64 | 64 | 64 | 63 |
| Abrasion ratio[2] | (%) | 102 | 103 | 103 | 103 | 104 | 105 | 105 | 105 | 106 | 107 |

TABLE 2

| | | Examples | | | | | | | | | |
|---|---|---|---|---|---|---|---|---|---|---|---|
| | | 11 | 12 | 13 | 14 | 15 | 16 | 17 | 18 | 19 | 20 |
| Polyvinyl chloride resin | (Parts by Weight) | 100 | 100 | 100 | 100 | 100 | 100 | 100 | 100 | 100 | 100 |
| DOP | (Parts by Weight) | 120 | 90 | 90 | 90 | 90 | 120 | 120 | 120 | 120 | 120 |
| Calcium Carbonate | (Parts by Weight) | 140 | 160 | 160 | 160 | 160 | 150 | 150 | 150 | 150 | 150 |
| Carbon black | (Parts by Weight) | 1 | 1 | 1 | 1 | 1 | 1 | 1 | 1 | 1 | 1 |
| EXPANSEL DE | (Wt %) | — | 0.1 | 0.2 | 0.3 | 0.4 | 1 | 2 | 3 | 4 | 5 |
| GLASSBUBBLE B37/2000 | (Wt %) | 9 | 0.4 | 0.3 | 0.2 | 0.1 | 8 | 7 | 6 | 5 | 4 |
| Dispersing agent | (Parts by Weight) | 5 | 5 | 5 | 5 | 5 | 5 | 5 | 5 | 5 | 5 |
| Weight | (g/l) | 1170 | 1290 | 1290 | 1280 | 1280 | 1170 | 1060 | 1030 | 1000 | 970 |
| Weight reduction ratio | (%) | 18.8 | 10.4 | 10.4 | 11.1 | 11.1 | 18.8 | 26.4 | 28.5 | 30.6 | 32.6 |
| Anti-Chipping property Test | (kg) | 63 | 65 | 65 | 66 | 66 | 62 | 63 | 63 | 62 | 62 |
| Abrasion ratio | (%) | 108 | 103 | 103 | 102 | 102 | 108 | 108 | 107 | 107 | 106 |

TABLE 3

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Polyvinyl chloride resin | (Parts by Weight) | 100 | 100 | 100 | 100 | 100 | 100 | 100 | 100 | 100 | 100 |
| DOP | (Parts by Weight) | 90 | 90 | 120 | 100 | 120 | 90 | 90 | 90 | 120 | 120 |
| Calcium Carbonate | (Parts by Weight) | 160 | 160 | 150 | 150 | 140 | 160 | 160 | 160 | 140 | 140 |
| Carbon black | (Parts by Weight) | 1 | 1 | 1 | 1 | 1 | 1 | 1 | 1 | 1 | 1 |
| EXPANSEL DE | (Wt %) | — | 0.4 | 6 | — | — | 0.1 | 0.2 | 0.3 | 1 | 2 |
| GLASSBUBBLE B37/2000 | (Wt %) | — | — | — | 0.9 | 10 | 0.3 | 0.2 | 0.1 | 9 | 8 |
| Dispersing agent | (Parts by Weight) | 5 | 5 | 5 | 5 | 5 | 5 | 5 | 5 | 5 | 5 |
| Weight | (g/l) | 1440 | 1330 | 970 | 1300 | 1160 | 1360 | 1350 | 1340 | 1100 | 1060 |
| Weight reduction ratio | (%) | 0 | 7.6 | 32.6 | 9.7 | 19.4 | 5.6 | 6.3 | 6.9 | 23.6 | 26.4 |
| Anti-Chipping property Test | (kg) | 66 | 65 | 57 | 64 | 58 | 63 | 64 | 65 | 58 | 58 |
| Abrasion ratio | (%) | 102 | 102 | 105 | 105 | 111 | 103 | 102 | 102 | 109 | 108 |

TABLE 4

|  |  | Comparative Examples | | |
|---|---|---|---|---|
|  |  | 11 | 12 | 13 |
| Polyvinyl chloriden resin | (Parts by Weight) | 100 | 100 | 100 |
| DOP | (Parts by Weight) | 120 | 120 | 120 |
| Calcium Carbonate | (Parts by Weight) | 140 | 140 | 140 |
| Carbon black | (Parts by Weight) | 1 | 1 | 1 |
| EXPANSEL DE | (Wt %) | 3 | 4 | 5 |
| GLASSBUBBLE B37/2000 | (Wt %) | 7 | 6 | 5 |
| Dispersing agent | (Parts by Weight) | 5 | 5 | 5 |
| Weight | (g/l) | 1030 | 1000 | 960 |
| Weight reduction ratio | (%) | 28.5 | 30.6 | 33.3 |
| Anti-Chipping property Test | (kg) | 57 | 57 | 57 |
| Abrasion ratio | (%) | 108 | 107 | 107 |

What is claimed is:

1. A light, anti-chipping coating consisting essentially of a blend of 100 parts by weight of a polyvinyl resin capable of forming a plastisol, 50 to 200 parts by weight of a plasticizer for said resin, 2 to 20 parts by weight of additives and 80 to 350 parts by weight of a filler component, said filler component consisting of from 0.5 to 5% by weight of expanded thermoplastic microspheres and the balance being solid calcium carbonate filler powder.

2. A light, anti-chipping coating consisting essentially of a blend of 100 parts by weight of a polyvinyl resin capable of forming a plastisol, from 50 to 200 parts by weight of a plasticizer for said resin, from 2 to 20 parts by weight of additives and 80 to 350 parts by weight of filler component, said filler component consisting of from 0.5 to 5% by weight, based on the weight of said filler component, of vinylidene chloride/acrylonitrile copolymer, hollow, filler particles and the balance being solid calcium carbonate filler powder.

3. A coating as claimed in claim 1, in which said plasticizer is dioctyl phthalate and is present in an amount of 100 parts by weight, said solid filler powder is present in an amount of 150 parts by weight, said organic, hollow, filler particles are present in an amount of 1% by weight and said additives are carbon black and a dispersing agent and are present in an amount of 1 part by weight and 5 parts by weight, respectively.

4. A coating as claimed in claim 1, in which said plasticizer is dioctyl phthalate and is present in an amount of 100 parts by weight, said solid filler powder is present in an amount of 150 parts by weight, said organic, hollow, filler particles are present in an amount of 3% by weight and said additives are carbon black and a dispersing agent and are present in an amount of 1 part by weight and 5 parts by weight, respectively.

5. A coating as claimed is claim 1 in which said filler component has a particle size of less than 200μ and has a bulk density of less than 0.1

6. A light, anti-chipping coating consisting essentially of a blend of 100 parts by weight of a polyvinyl chloride resin capable of forming a plastisol, 50 to 200 parts by weight of a plasticizer for said resin, 2 to 20 parts by weight of additives and from 80 to 350 parts by weight of filler component, said filler component consisting of (1) a member selected from the group consisting for from 1 to 9% by weight of glass or silica, hollow, filler particles, from 0.5 to 5% by weight of vinylidene chloride/acrylonitrile copolymer, hollow, hollow, filler particles, and from 0.5% to 9% by weight of glass or silica and vinylidene chloride/acrylonitrile copolymer, hollow, filler particles, said weight of said filler particles being based on the weight of said filler component, and (2) the balance being solid calcium carbonate filler powder.

* * * * *

UNITED STATES PATENT AND TRADEMARK OFFICE
CERTIFICATE OF CORRECTION

PATENT NO. : 5 212 215
DATED : May 18, 1993
INVENTOR(S) : Yasuo NANRI et al

It is certified that error appears in the above-identified patent and that said Letters Patent is hereby corrected as shown below:

On the title page, item [75] Inventors:

change "Yasuo Nanri, Chiryu" to ---Yasuo Nanri, Chiryu-shi---.

change "Mitsuo Hironaga, Toyota" to ---Mitsuo Hironaga, Toyota-shi---.

change "Akio Sato, Chiryu" to ---Akio Sato, Chiryu-shi---.

Column 7:
Claim 2, line 31; change "polyvinyl resin" to ---polyvinyl chloride resin---.

line 34; change "and 80" to ---and from 80---.

Column 8:
Claim 6, line 25; change "resin, 2 to 20" to ---resin, from 2 to 20---.

Column 8:
Claim 6, line 28; change "consisting for" to ---consisting of---.

line 32; delete "hollow" (second occurrence).

UNITED STATES PATENT AND TRADEMARK OFFICE
CERTIFICATE OF CORRECTION

PATENT NO. : 5,212,215
DATED : May 18, 1993
INVENTOR(S) : Yasuo NANRI et al

It is certified that error appears in the above-indentified patent and that said Letters Patent is hereby corrected as shown below:

Column 8: Claim 5, line 19; change "is Claim 1" to --in Claim 1--.

Signed and Sealed this

Twenty-ninth Day of March, 1994

*Attest:*

BRUCE LEHMAN

*Attesting Officer*     *Commissioner of Patents and Trademarks*